(12) United States Patent
Merkl et al.

(10) Patent No.: US 10,936,148 B1
(45) Date of Patent: Mar. 2, 2021

(54) TOUCH INTERACTION IN AUGMENTED AND VIRTUAL REALITY APPLICATIONS

(71) Applicant: SAP SE, Walldorf (DE)

(72) Inventors: Rita Merkl, Berlin (DE); Manfred Johann Pauli, Bad Schönborn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/727,422

(22) Filed: Dec. 26, 2019

(51) Int. Cl.
*G06F 3/0481* (2013.01)
*G06F 3/0488* (2013.01)
*G06F 3/0484* (2013.01)
*G06F 3/0482* (2013.01)

(52) U.S. Cl.
CPC ........ *G06F 3/04815* (2013.01); *G06F 3/0482* (2013.01); *G06F 3/0488* (2013.01); *G06F 3/04845* (2013.01)

(58) Field of Classification Search
CPC ....... G06F 3/04815; G06T 2200/00–08; G06T 19/00; G06K 9/00671
See application file for complete search history.

(56) References Cited

U.S. PATENT DOCUMENTS

| | | | |
|---|---|---|---|
| 9,489,216 B2 | 11/2016 | Walter et al. | |
| 2013/0145316 A1* | 6/2013 | Heo | G06F 3/0488 715/810 |
| 2016/0321034 A1 | 11/2016 | Yen et al. | |
| 2018/0239520 A1* | 8/2018 | Hinckley | G06F 3/0482 |
| 2019/0339839 A1* | 11/2019 | Paul, Sr. | G06K 9/00671 |

FOREIGN PATENT DOCUMENTS

| | | |
|---|---|---|
| KR | 2013-0107777 A | 10/2013 |
| KR | 2014-0086261 A | 7/2014 |

OTHER PUBLICATIONS

"Omni Swipe—Small and Quick 2.34," printed Aug. 22, 2018, from https://omni-swipe-small-and-quick.soft112.com/, 7 pages.

* cited by examiner

*Primary Examiner* — Ajay M Bhatia
*Assistant Examiner* — Mong-Shune Chung
(74) *Attorney, Agent, or Firm* — Sterne, Kessler, Goldstein & Fox P.L.L.C.

(57) ABSTRACT

Disclosed herein are system, method, and computer program product embodiments for providing accessible menus in 3D visualization contexts, such as augmented reality and virtual reality environments. In one aspect, a menu in the shape of a circle segment may be presented within a corner of a 3D visualization, allowing a user to easily access icons present within that menu using a touch interface. The user may rotate the menu in order to access additional icons.

20 Claims, 8 Drawing Sheets

US 10,936,148 B1

TOUCH INTERACTION IN AUGMENTED AND VIRTUAL REALITY APPLICATIONS

CROSS-REFERENCE TO RELATED APPLICATIONS

This application is related to U.S. Design application Nos. 29/718,579 and 29/718,580, filed concurrently herewith, which are incorporated herein by reference in their entireties.

BACKGROUND

Augmented reality (AR) and virtual reality (VR) continue to grow in popularity as new applications are developed that take advantage of these techniques. AR allows for applications that build on the world around us, while VR immerses users in entire 3D worlds.

Common to both of these approaches is the need for user interface tools that minimize distraction, while also being adaptable to the particular devices used for AR and VR applications. Traditional interfaces used in 2D or even 3D desktop applications are clunky and unintuitive in a 3D visualization context such as AR or VR, and may distract from the experience.

Accordingly, new interface technologies are needed to simplify AR and VR interactions.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for interacting with elements of an augmented reality (AR), virtual reality (VR) system, or other 3D visualization interface.

When viewing with a 3D visualization, users often need to interact with the 3D visualization in a variety of different ways. For example, a user may wish to change their perspective within the 3D visualization. Commonly, this means that the user must manipulate a virtual camera somehow, where the parts of a 3D scene visible to the virtual camera determine what is rendered and provided to the user as the 3D visualization.

For example, in the VR context, a user may view the 3D visualization through a VR display device (such as a VR headset). In order to change their perspective within the 3D visualization, the user may move their head, manipulate a VR controller, or otherwise signal a desired change in perspective. This request causes a virtual camera to move within a 3D scene in a corresponding manner, and the new perspective of this virtual camera is used to determine the 3D visualization that will be rendered and displayed through the VR display device.

In the AR context, a user may hold a handheld display (such as a tablet device or a mobile phone) in front of them, allowing a physical camera mounted on the back of the display to capture the environment around the user. By moving the display, the user will also move the attached physical camera, and therefore see a different portion of the environment around them. However, a virtual camera (as in the VR context) may be moved together with the motion of the display in order to determine what portion of a 3D object or other element of a 3D scene should be incorporated into the captured image of the user's environment and shown on the display. In an additional embodiment, software may identify elements of the environment around the user upon which to render the 3D object or other element of the 3D scene.

Interactions such as these do not necessarily require visual information beyond the 3D visualization itself. However, some interactions require either additional explanation or a simplified approach to their implementation. One example is the use of menus. Menus are commonplace in 2D systems, such as desktops, and their use carries over to the AR and VR context in certain applications. For example, menus can provide rich, context-specific interactions that correspond to a particular display element that a user wishes to interact with, simplifying certain tasks.

Figure 1:
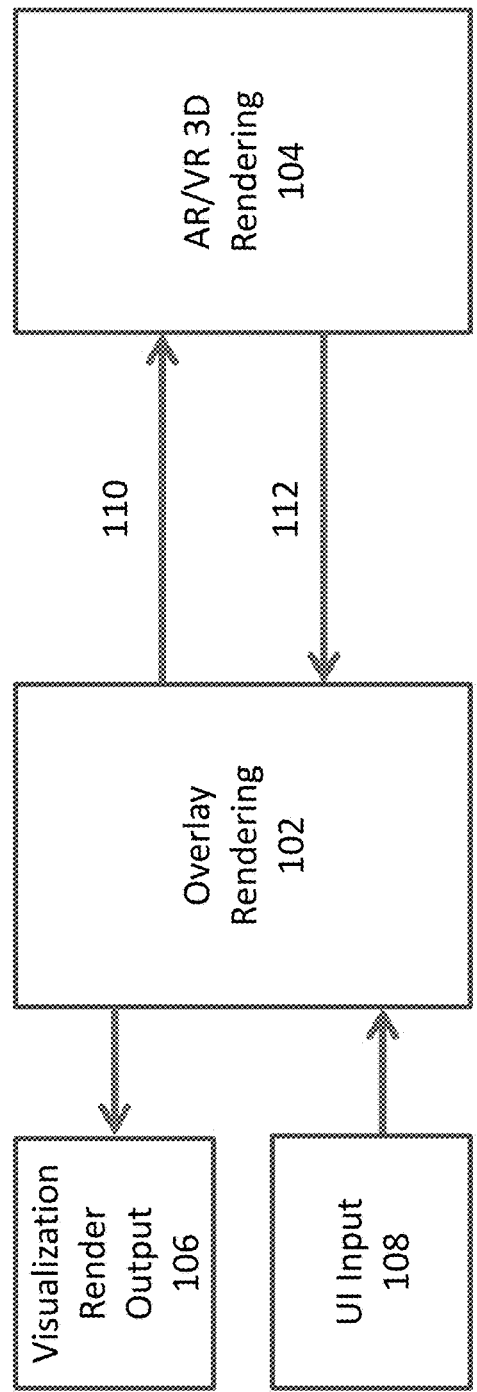
FIG. 1 illustrates a system architecture, in accordance with an embodiment.

FIG. 1 illustrates a system architecture 100, in accordance with an embodiment. In this embodiment, an AR or VR 3D rendered visualization may be generated and provided by rendering block 104. This rendered visualization is passed at 112 to an overlay rendering block 102. Overlay rendering block 102 is configured to provide a 2D menu overlay that can then be output as visualization render output 106. A UI input 108 (such as a touchscreen, touchpad, controller, or other input device) may be used to interact with the overlay rendering block 102 to manipulate elements of the 3D visualization, and such manipulations may be passed at 110 back to the AR or VR 3D rendering block 104 in order to perform a requested task.

One skilled in the relevant arts will appreciate that these particular architectural blocks need not be structured in this precise way—system architecture 100 is shown by way of a simplified message flow to illustrate the interaction between 2D overlaid menu items and an underlying 3D scene rendered as a 3D visualization. Other functional divisions that perform the operations described herein are contemplated within the scope of this disclosure, as would be understood by one skilled in the relevant arts.

Figure 2:
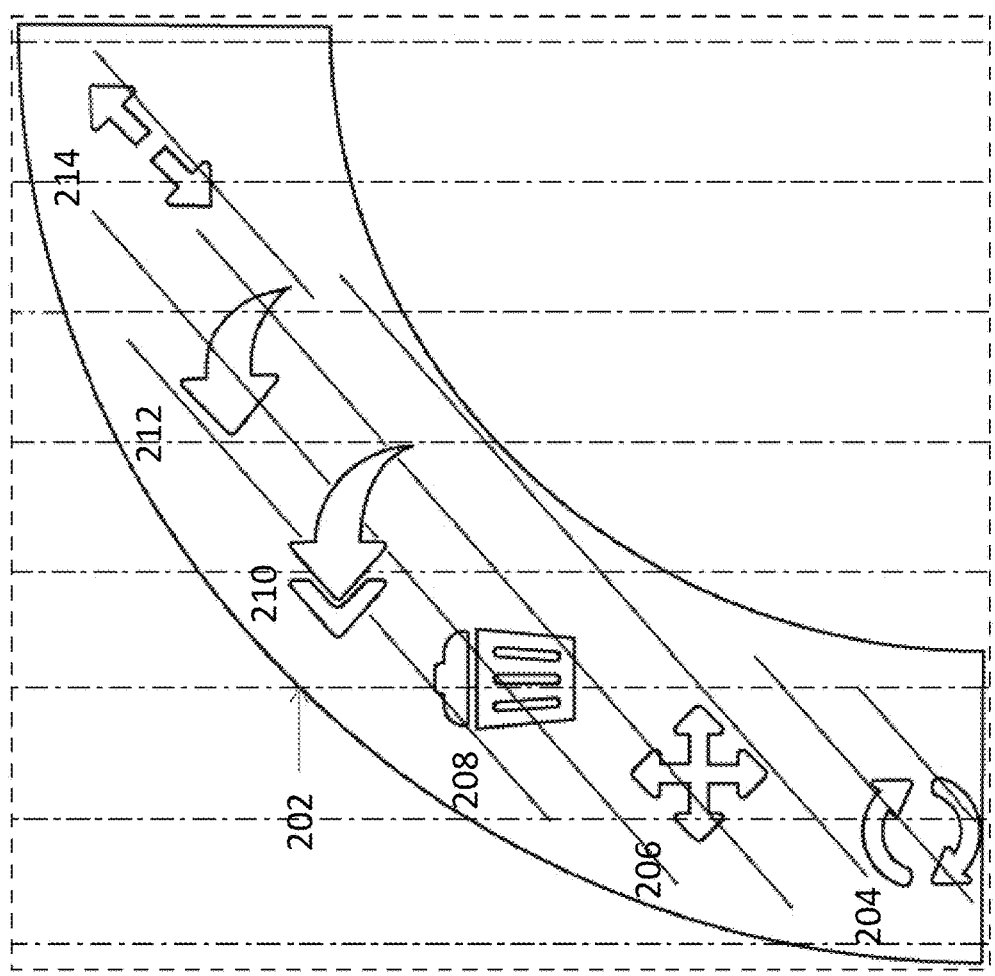
FIG. 2 illustrates a menu overlay, in accordance with an embodiment.

FIG. 2 illustrates a menu overlay 200, in accordance with an embodiment. In accordance with an embodiment, menu overlay 200 may be overlaid as a 2D overlay on a rendered 3D scene to create a 3D visualization that is the combination of the menu overlay 200 and the underlying 3D scene. This 3D visualization may then be displayed to a user of an AR or VR display device.

In accordance with an embodiment, menu overlay 200 is depicted as a circle, of which a segment 202 is visible within the 3D visualization. As shown in FIG. 2, segment 202 extends from one edge of the 3D visualization to another edge in a 90 degree arc at a corner of the 3D visualization. One skilled in the relevant arts will appreciate, however, that segment 202 need not extend the full 90 degree arc. Additionally, segment 202 may be adaptable to non-right angle corners of a 3D visualization that is not rectangular.

As shown in FIG. 2, segment 202 includes several exemplary icons 204, 206, 208, 210, 212, and 214. In accordance with an embodiment, these icons 204, 206, 208, 210, 212, and 214 may be configured to perform a task on an object present within the 3D visualization. In accordance with an additional embodiment, these icons 204, 206, 208, 210, 212, and 214 may be configured to perform a task on the 3D visualization as a whole. One skilled in the relevant arts will appreciate that a variety of context-specific and non-context-specific tasks may be assigned to each of these icons 204, 206, 208, 210, 212, and 214.

A user of the AR or VR system may interact with these icons using an input device, in accordance with an embodiment. The placement of this circular menu simplifies the user's access to the icons.

For example, when holding a handheld display (such as a tablet device or mobile phone) in order to view an AR 3D visualization, a typical user will hold the display in both hands while moving the display around the environment. By disposing the menu overlay 200 within a corner of the display and within reach of a user's thumbs, the user will be able to reach all of the icons 204, 206, 208, 210, 212, and 214 along the arc of segment 202 without needing to release their grip on the device.

Similarly, when using a touch pad interface for a VR device, the expected position for interacting with icons 204, 206, 208, 210, 212, and 214 corresponds to a location of the touch pad within reach of the user's thumb, or whichever finger is expected to be the primary finger for interacting with the touch pad.

Although segment 202 is shown corresponding to its placement at a lower-right corner of the 3D visualization, one skilled in the relevant arts will appreciate that the underlying circle, of which segment 202 is visible, may be placed in other positions along an edge or corner of the 3D visualization, with corresponding segments visible (e.g., along an edge with a segment having a 180 degree arc visible).

Figure 3:
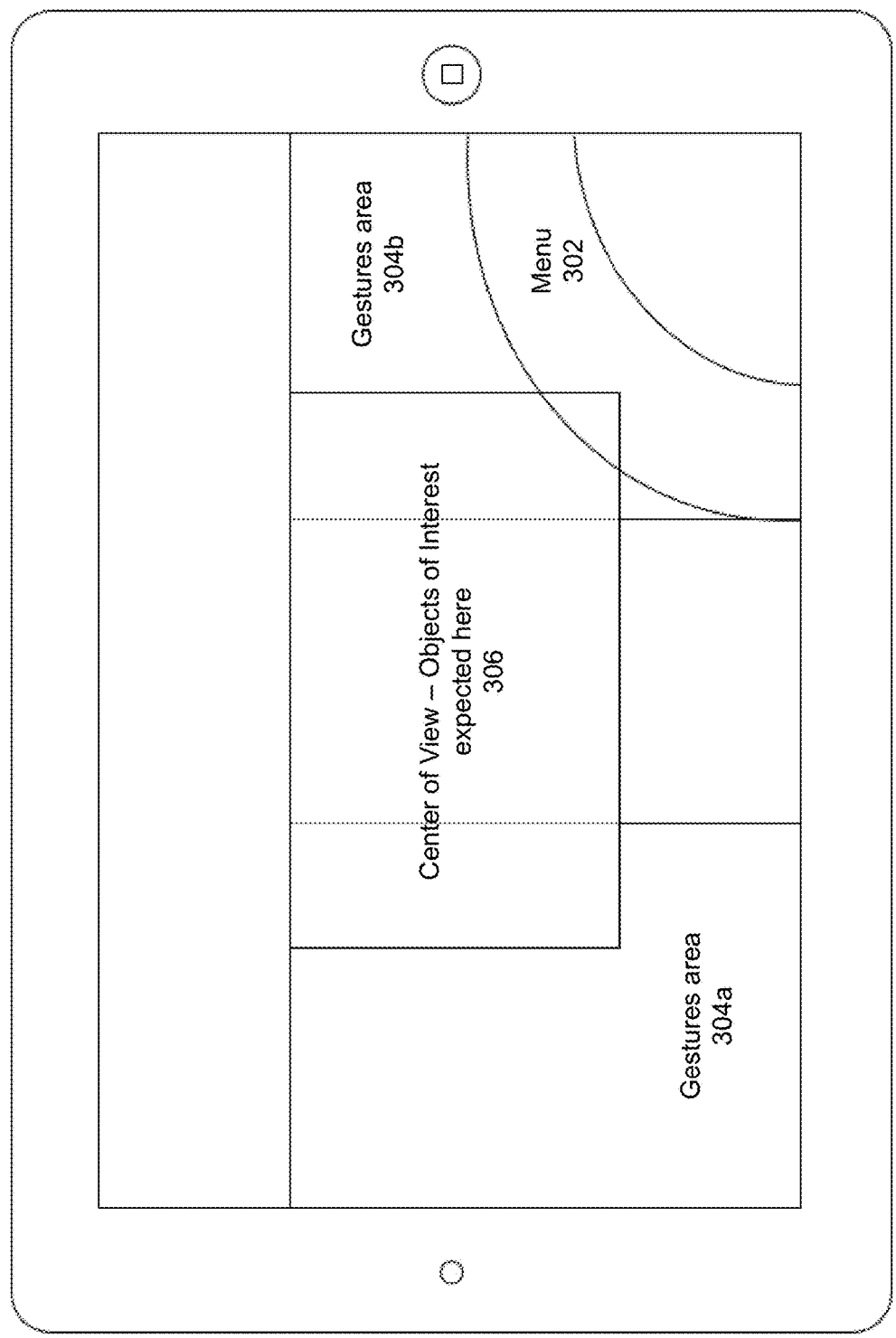
FIG. 3 illustrates 3D visualization on a handheld display, such as a tablet device or mobile phone, in accordance with an embodiment.

FIG. 3 illustrates 3D visualization on a handheld display, such as a tablet device 300 or mobile phone, in accordance with an embodiment. For the purposes of this example, tablet device 300 is used even though one skilled in the relevant arts would appreciate that other display devices (such as mobile phones) may be substituted.

In accordance with an embodiment, tablet device 300 renders an AR visualization. A user would be expected to grip tablet device 300 by the sides (in the case of tablet device 300, the top and bottom of the device, shown on the left and right of FIG. 3 respectively). Menu 302 is shown on the bottom right corner of tablet device 300 in accordance with an embodiment of the invention. When gripping tablet device 300, the arc of a visible segment of menu 302 is within touch reach of a user's thumb, allowing for selection of icons, such as icons 204, 206, 208, 210, 212, and 214 of FIG. 2, without needing to release the tablet device 300.

As previously noted, menu 302 could be disposed elsewhere within the AR visualization on tablet device 300. For example, menu 302 could be moved to the bottom left corner of the AR visualization for ease of access by left-handed users. Additionally, two (or more) separate menus like menu 302 could be present, such as on both the bottom-left and bottom-right corners of the AR visualization to allow for two-handed access to menus.

As shown in FIG. 3, the AR visualization includes gesture areas 304a and 304b on the left and right sides of the AR visualization, in accordance with an embodiment. These gesture areas may be used for a variety of purposes, including calling up menu 302. A user may perform gestures in these regions with their thumbs, again without removing their grip on tablet device 300. Gestures may include, by way of non-limiting example, a swipe up, down, left, or right; a tap, or multi-tap; or tracing specific shapes. For example, a user may swipe up in gesture area 304b in order to cause menu 302 to appear, although such interaction is not a prerequisite to the use of gesture areas 304a and 304b. One skilled in the relevant art will appreciate that similar gesture areas may be present for VR visualizations or other 3D visualizations.

Area of interest 306 facilitates context-specific interaction with an object in a 3D visualization. In either an AR or VR visualization scenario, a user may focus area of interest 306 on a particular object or other element of a 3D scene. In order to interact with that object, the user may pull up menu 302.

When populating icons into menu 302, such as icons 204, 206, 208, 210, 212, and 214 of FIG. 2, these icons may be configured based on the object present within area of interest 306. In particular, these icons may be configured based on context-specific operations that can be performed on the object, although one skilled in the relevant art will appreciate that not all of the icons need to be context-specific to the object, and may perform other operations (such as manipulating the 3D visualization).

Figure 4B:
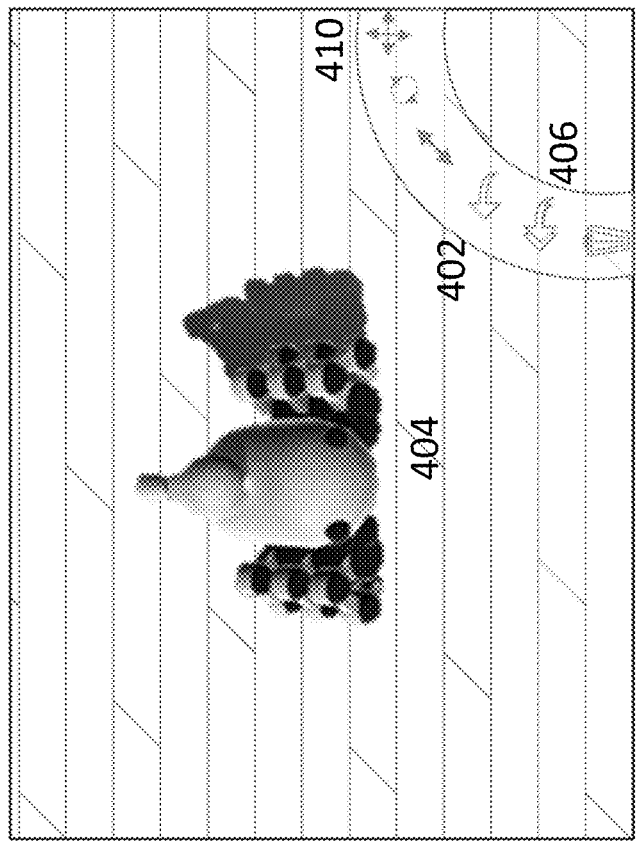
FIGS. 4A and 4B illustrate menu interaction in a live environment, in accordance with an embodiment.
Figure 4A:
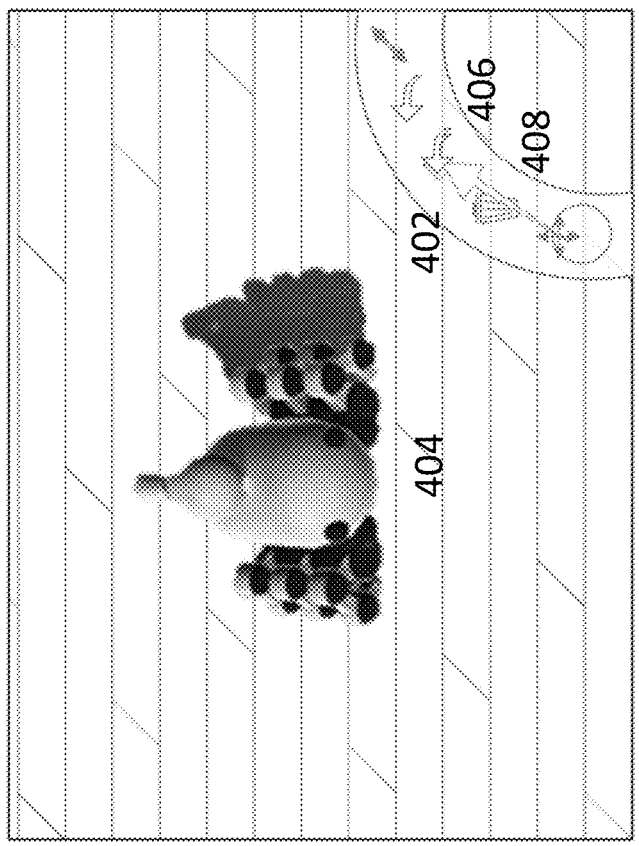

FIGS. 4A and 4B illustrate menu interaction in a live environment, in accordance with an embodiment. As shown in scene 400a of FIG. 4A, an object 404 is present in the middle of the scene. By way of non-limiting example, this object may be interacted with using context-specific icons shown in menu 402a.

In accordance with an embodiment, menu 402a is shown translucent. This allows elements of scene 400a to be visible (at least partly) through menu 402a. One skilled in the relevant arts will appreciate, however, that menu 402a may be various colors, levels of translucency (including completely opaque), thicknesses, or otherwise take on alternative appearances. Moreover, menu 402a need not be completely circular (for example, menu 402a may have the general form of an n-gon, of which only a segment along an arc is visible like with the circular embodiment).

Context-specific icons selected from menu 402a would perform an operation on object 404. For example, selecting the trash can icon in menu 402a may cause object 404 to be deleted from the scene 400a. Selecting one of the arrow icons in menu 402a may cause object 404 to move within the scene accordingly. Additionally, selecting one of the icons in menu 402a may cause other interactions, either context-specific or non-context specific, including changing an interaction mode. For example, an additional interaction mode may include swapping a control, so that a control that would normally move a virtual camera corresponding to scene 400a would instead move object 404.

The transition from FIG. 4A and FIG. 4B shows a translation of menu 402, in accordance with an embodiment. By way of non-limiting example, a user may tap on menu 402 and perform a dragging motion, causing menu 402 to spin clockwise or counterclockwise consistent with the direction of the dragging motion relative to the position of the tap. This spinning effect is performed by moving the icons present within menu 402 in the corresponding clockwise or counterclockwise direction.

Menu 402 may comprise more icons than may be visible within a visible segment of an underlying circle of menu 402. As menu 402 as shown in FIG. 4A spins and translates (in a rotational motion) to menu 402 as shown in FIG. 4B, icons may exit a visible area from a first end of the visible segment of menu 402, and additional icons may enter the visible area from a second end of the visible segment of menu 402. For example, in FIG. 4A a user has touched element 406 and dragged it along the counterclockwise direction of menu 402a. In FIG. 4B, element 406 is now shown translated along the counterclockwise direction of menu 402, but trash can icon 408 has exited the visible segment of menu 402 along the bottom edge (not visible in FIG. 4B). However, new icons have entered the visible segment of menu 402 along the right side, including cross icon 410.

Although menu 402 is visualized as an arc segment of a circle, any non-visible portion of the circle need not be rendered or otherwise exist other than for ease of understanding. The visible arc segment may display more or fewer icons than would otherwise be accommodated in a full circle traced from the visible arc segment.

Menu 402 may be constantly visible, in accordance with an embodiment. In an alternative embodiment, a user may tap on an object (such as object 404) in order to interact with it using menu 402—perhaps including context-specific interactions. The user may also select the object (such as object 404) for interaction with menu 402 in other ways, such as by centering object 404 within a particular region of the 3D visualization (e.g., area of interest 306 of FIG. 3), at which point the menu may automatically appear. Or a user may call up the menu manually by performing a gesture, uttering a phrase, or performing some other trigger. Additional ways of interacting with the menu are described with respect to FIG. 5.

Figure 5:
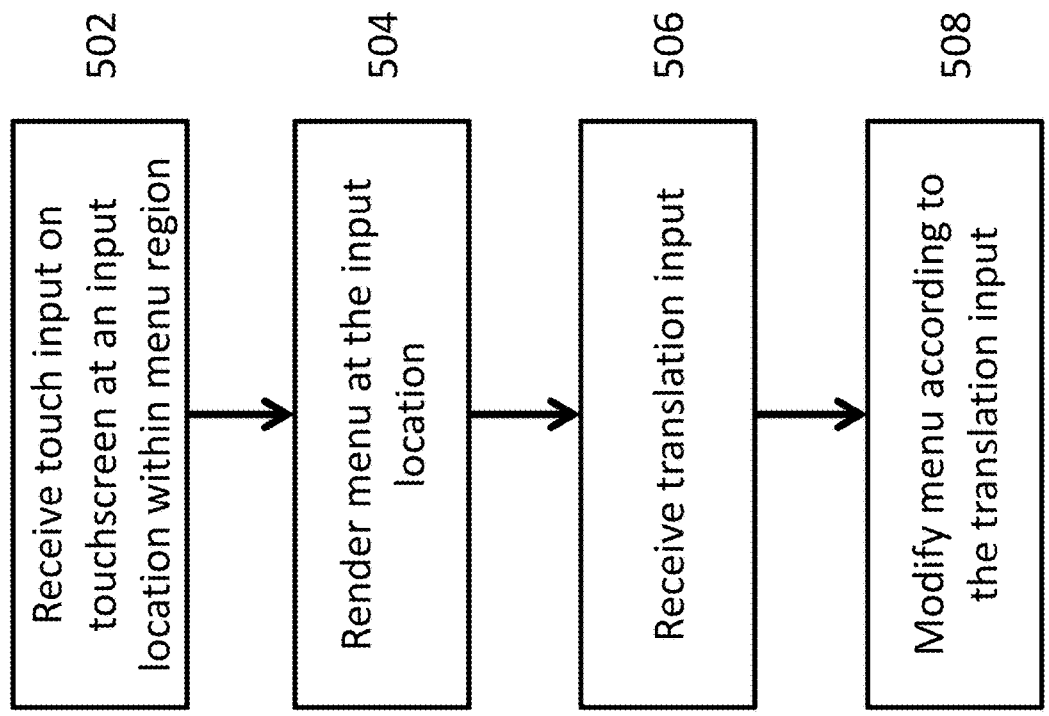
FIG. 5 is a flowchart illustrating steps by which a menu may be accessed in a touchscreen context, in accordance with an embodiment.

FIG. 5 is a flowchart 500 illustrating steps by which a menu may be accessed in a touchscreen context, in accordance with an embodiment. This touchscreen context may be useful, for example, in an AR environment using a tablet device. The process begins at step 502 where a touch input on a touchscreen is received at an input location, where the input location is within a menu region. By way of non-limiting example, this menu region corresponds to a portion of a 3D visualization in which the menu could potentially be rendered. As a result of this touch input, the menu may be rendered at the input location at step 504—specifically, the menu may be sized and placed within the 3D visualization so that at least a portion is present where the touch input was made.

At step 506, a translation input is received, in accordance with an embodiment. This translation input may be, by way of non-limiting example, a swiping motion following the aforementioned touch input—causing the menu to rotate upon its display. However, step 506 may be performed once the menu is already displayed, and could include a touch-and-swipe interaction to cause the menu to rotate. Other exemplary interactions are described above. At step 508, the menu is modified according to the interaction, such as by translating (rotating along the arc of the menu) the menu icons.

Figure 6:
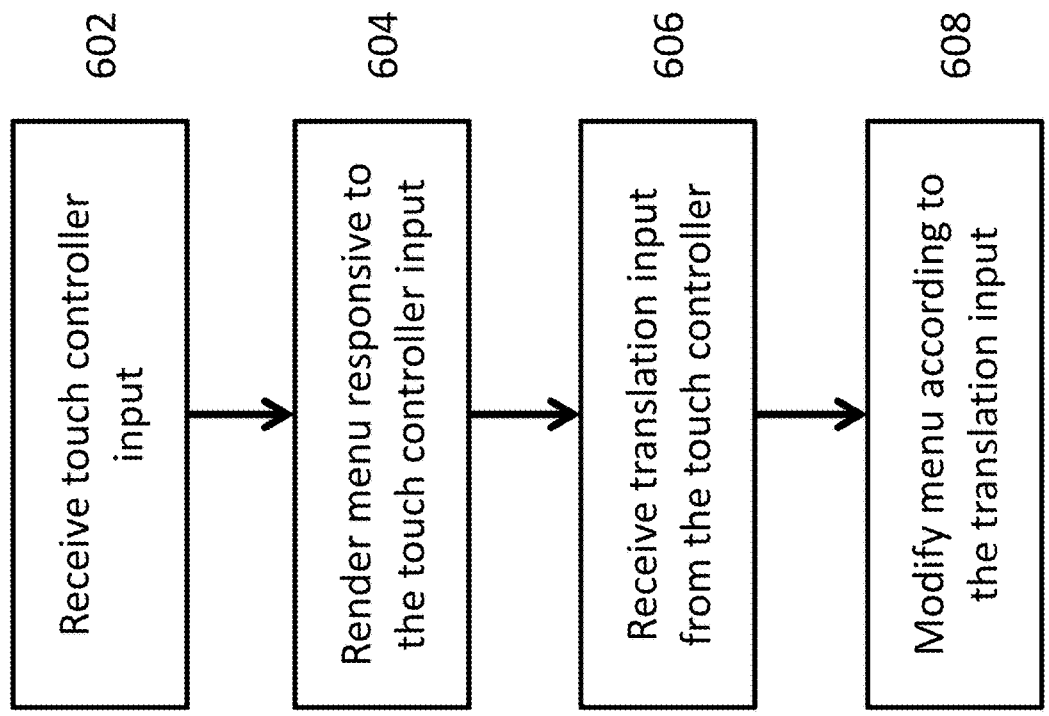
FIG. 6 is a flowchart illustrating steps by which a menu may be accessed in a touch controller context, in accordance with an embodiment.

FIG. 6 is a flowchart 600 illustrating steps by which a menu may be accessed in a touch controller context, in accordance with an embodiment. This touch controller context may be useful, for example, in a VR environment using a VR display device. This approach is similar to the one described in flowchart 500 of FIG. 5, but with the use of a touch controller instead. At step 602, a touch controller input is received and, at step 604, the menu is rendered responsive to the touch controller input. By way of non-limiting example, the touch controller input may be a gesture that is associated with displaying the menu.

At step 606, a translation input is received from the touch controller, in accordance with an embodiment. As with the touch screen, this translation input may be, by way of non-limiting example, a swiping motion following the aforementioned touch input—causing the menu to rotate upon its display. However, step 606 may be performed once the menu is already displayed, and could include a touch-and-swipe interaction to cause the menu to rotate. Other exemplary interactions are described above. In the case of a controller, other input devices may be usable to indicate a menu translation in addition to the touch pad. At step 608, the menu is modified according to the interaction, such as by translating (rotating along the arc of the menu) the menu icons.

Figure 7:
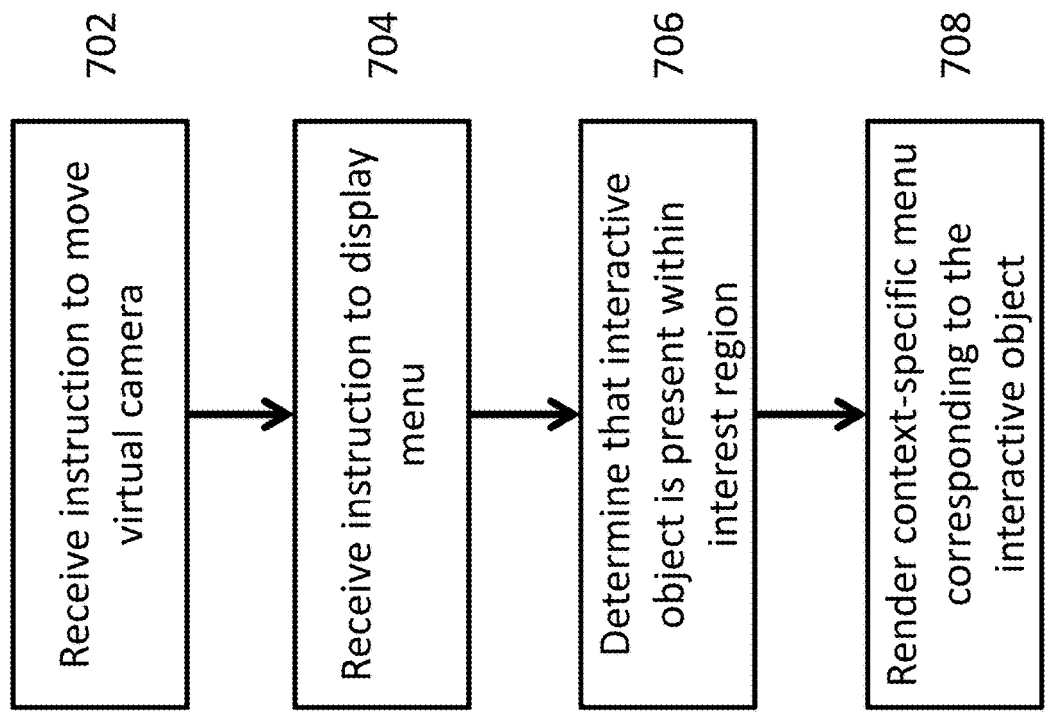
FIG. 7 is a flowchart illustrating steps by which a menu may be configured to include context-specific operations, in accordance with an embodiment.

FIG. 7 is a flowchart 700 illustrating steps by which a menu may be configured to include context-specific operations, in accordance with an embodiment. In this context, a 3D visualization is rendered—for example, on a tablet device showing an AR visualization, or a VR headset showing a VR visualization—and a view of that 3D visualization may be manipulated by the user. By way of non-limiting example, a virtual camera is placed within a scene to capture and render the scene from its perspective. The rendered scene from the perspective of the virtual camera is what is shown to the user on the tablet device, VR headset, or other display device.

At step 702, an instruction is received to move the virtual camera, in accordance with an embodiment. For example, a user may move the tablet device in order to look at a different portion of the scene, moving the virtual camera simultaneously with this action. Or a user may turn their head while wearing a VR headset, causing the virtual camera to also turn in the direction of the user's head and render the scene in the direction the user is now looking.

At step 704, an instruction is received to display a menu, in accordance with an embodiment. By way of non-limiting example, this menu may be a menu such as menu 200 of FIG. 2.

At step 706, a determination is made that an interactive object is present within an area of interest. For example, as shown in FIG. 3, tablet 300 has an area of interest 306 within a central portion of the 3D visualization it is displaying. By moving the virtual camera as in step 702, a user may place a particular interactive object within this region, and then call up the menu at step 704. In accordance with an embodiment, the menu may already be present, and the menu's contents may change based on the determination of step 706, as appropriate.

At step 708, the menu is rendered to include one or more context-specific icons that perform context-specific operations with respect to the interactive object.

Figure 8:
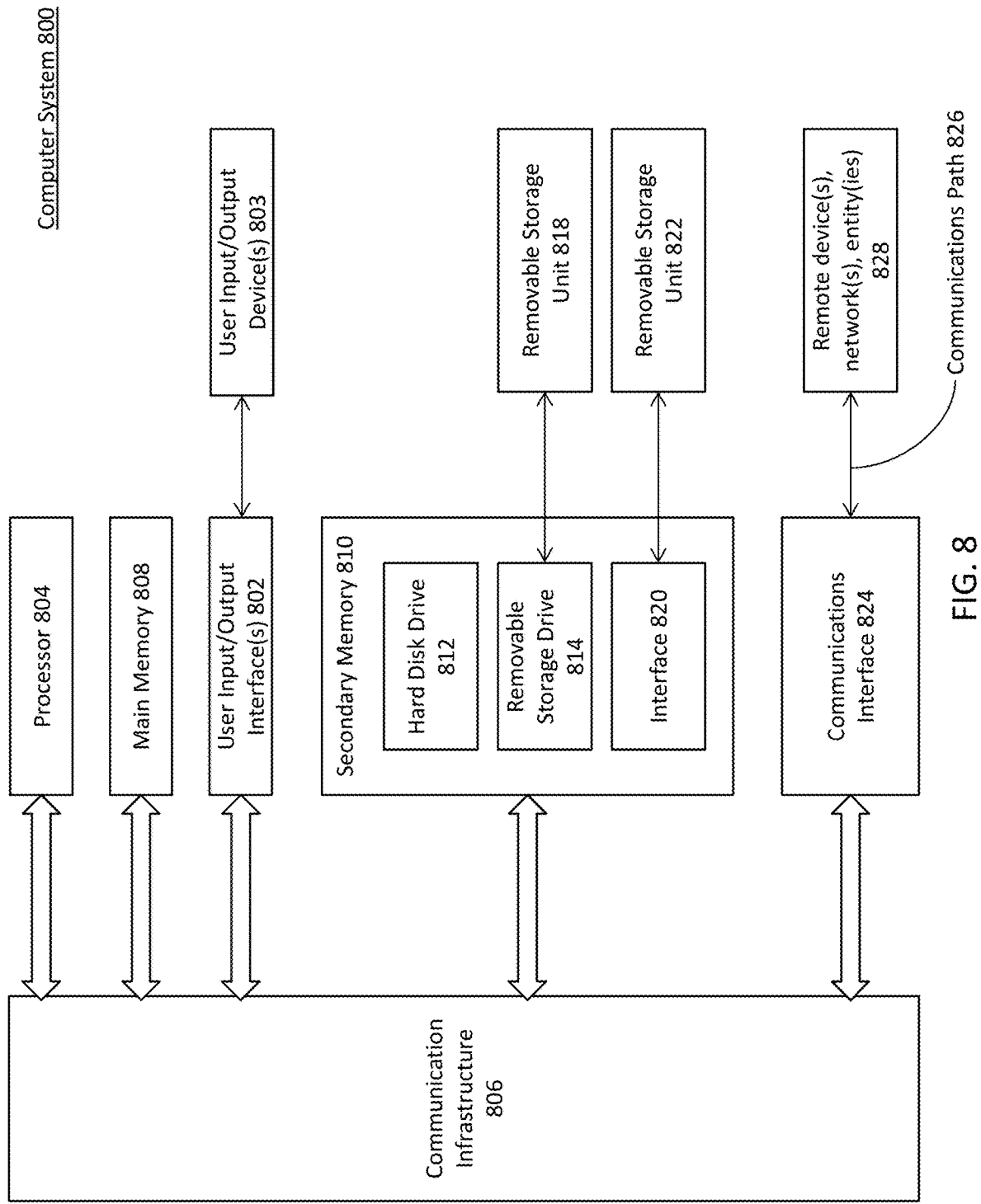
FIG. 8 is an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method, comprising:
    selecting, by one or more computing devices, an object of a 3D scene responsive to the object being centered within an area of interest of a 3D visualization, wherein the 3D visualization comprises a perspective of a virtual camera within the 3D scene;
    rendering, by the one or more computing devices, a 2D overlay menu over a portion of the 3D visualization responsive to the selecting of the object, wherein the 2D overlay menu is depicted as a section of a circle comprising a plurality of icons configured to perform respective tasks, and wherein at least a first of the plurality of icons is configured to perform its context-specific respective task on the object;
    receiving, by the one or more computing devices, a translation interaction within the portion of the 3D visualization overlaid by the 2D overlay menu; and
    modifying, by the one or more computing devices, the position of the plurality of icons within the 2D overlay menu responsive to the translation interaction.

2. The computer implemented method of claim 1, wherein the 3D visualization is rendered as an augmented reality (AR) visualization on a handheld display, and wherein the portion of the 3D visualization overlaid by the 2D overlay menu comprises a touch screen region of the handheld display.

3. The computer implemented method of claim 2, wherein rendering the 2D overlay menu over the portion of the 3D visualization responsive to the selecting of the object comprises:
    rendering, by the one or more computing devices, the 2D overlay menu such that the portion of the 3D visualization includes a position of a touch interaction within the touch screen region of the handheld display.

4. The computer implemented method of claim 1, wherein the 3D visualization is presented as a virtual reality (VR) visualization on a VR display device, and wherein the portion of the 3D visualization overlaid by the 2D overlay menu comprises a touch pad region of a 3D VR input controller.

5. The computer implemented method of claim 1, wherein modifying the position of the plurality of icons comprises:
    rotating, by the one or more computing devices, the plurality of icons along an arc of the circle of the overlay menu, such that a first of the plurality of icons exits a visible region of the 2D overlay menu at a first end of the section of the circle, and a second of the plurality of icons enters the visible region of the 2D overlay menu at a second end of the section of the circle.

6. The computer implemented method of claim 1, wherein at least a second of the plurality of icons is configured to perform its respective task on the 3D visualization.

7. The computer implemented method of claim 1, wherein the context-specific respective task is configured to change an appearance of the object within the 3D scene, the method further comprising:
    rendering, by the one or more computing devices, the 3D visualization with the object having its appearance changed responsive to performance of the context-specific respective task on the object.

8. A system, comprising:
    a memory configured to store operations; and
    one or more processors configured to perform the operations, the operations comprising:
        selecting an object of a 3D scene responsive to the object being centered within an area of interest of a 3D visualization, wherein the 3D visualization comprises a perspective of a virtual camera within the 3D scene;
        rendering a 2D overlay menu over a portion of the 3D visualization responsive to the selecting of the object, wherein the 2D overlay menu is depicted as a section of a circle comprising a plurality of icons configured to perform respective tasks, and wherein at least a first of the plurality of icons is configured to perform its context-specific respective task on the object,
        receiving a translation interaction within the portion of the 3D visualization overlaid by the 2D overlay menu, and
        modifying the position of the plurality of icons within the 2D overlay menu responsive to the translation interaction.

9. The system of claim 8, wherein the 3D visualization is rendered as an augmented reality (AR) visualization on a handheld display, and wherein the portion of the 3D visualization overlaid by the 2D overlay menu comprises a touch screen region of the handheld display.

10. The system of claim 9, wherein rendering the 2D overlay menu over the portion of the 3D visualization responsive to the selecting of the object comprises:

rendering the 2D overlay menu such that the portion of the 3D visualization includes a position of a touch interaction within the touch screen region of the handheld display.

11. The system of claim 8, wherein the 3D visualization is presented as a virtual reality (VR) visualization on a VR display device, and wherein the portion of the 3D visualization overlaid by the 2D overlay menu comprises a touch pad region of a 3D VR input controller.

12. The system of claim 8, wherein modifying the position of the plurality of icons comprises:
rotating the plurality of icons along an arc of the circle of the overlay menu, such that a first of the plurality of icons exits a visible region of the 2D overlay menu at a first end of the section of the circle, and a second of the plurality of icons enters the visible region of the 2D overlay menu at a second end of the section of the circle.

13. The system of claim 8, wherein at least a second of the plurality of icons is configured to perform its respective task on the 3D visualization.

14. The system of claim 8, wherein the context-specific respective task is configured to change an appearance of the object within the 3D scene, the operations further comprising:
rendering the 3D visualization with the object having its appearance changed responsive to performance of the context-specific respective task on the object.

15. A non-transitory computer readable storage device having instructions stored thereon, execution of which, by one or more processing devices, causes the one or more processing devices to perform operations comprising:
selecting an object of a 3D scene responsive to the object being centered within an area of interest of a 3D visualization, wherein the 3D visualization comprises a perspective of a virtual camera within the 3D scene;
rendering a 2D overlay menu over a portion of the 3D visualization responsive to the selecting of the object, wherein the 2D overlay menu is depicted as a section of a circle comprising a plurality of icons configured to perform respective tasks, and wherein at least a first of the plurality of icons is configured to perform its context-specific task on the object;
receiving a translation interaction within the portion of the 3D visualization overlaid by the 2D overlay menu; and
modifying the position of the plurality of icons within the 2D overlay menu responsive to the translation interaction.

16. The non-transitory computer readable storage device of claim 15, wherein the 3D visualization is rendered as an augmented reality (AR) visualization on a handheld display, and wherein the portion of the 3D visualization overlaid by the 2D overlay menu comprises a touch screen region of the handheld display.

17. The non-transitory computer readable storage device of claim 16, wherein rendering the 2D overlay menu over the portion of the 3D visualization responsive to the selecting of the object comprises:
rendering the 2D overlay menu such that the portion of the 3D visualization includes a position of a touch interaction within the touch screen region of the handheld display.

18. The non-transitory computer readable storage device of claim 15, wherein the 3D visualization is presented as a virtual reality (VR) visualization on a VR display device, and wherein the portion of the 3D visualization overlaid by the 2D overlay menu comprises a touch pad region of a 3D VR input controller.

19. The non-transitory computer readable storage device of claim 15, wherein modifying the position of the plurality of icons comprises:
rotating the plurality of icons along an arc of the circle of the overlay menu, such that a first of the plurality of icons exits a visible region of the 2D overlay menu at a first end of the section of the circle, and a second of the plurality of icons enters the visible region of the 2D overlay menu at a second end of the section of the circle.

20. The non-transitory computer-readable storage device of claim 15, wherein the context-specific respective task is configured to change an appearance of the object within the 3D scene, the operations further comprising:
rendering the 3D visualization with the object having its appearance changed responsive to performance of the context-specific respective task on the object.

* * * * *